United States Patent Office 3,015,608
Patented Jan. 2, 1962

3,015,608
PROCESS OF RECOVERING INTRINSIC FACTOR FROM PYLORIC MUCOSA
Leon Ellenbogen and William L. Williams, New City, N.Y., assignors to American Cyanamid Company, New York, N.Y., a corporation of Maine
No Drawing. Filed Dec. 5, 1958, Ser. No. 778,306
9 Claims. (Cl. 167—74)

This invention relates to an improved process of producing a potent concentrate of intrinsic factor from the pyloric mucosa of hog stomachs.

It has been demonstrated that the oral administration of vitamin $B_{12}$, except in very massive doses which are not generally practical, is ineffective in the treatment of pernicious anemia. There is required another material which is called intrinsic factor. It is a failure of the human stomach to produce a sufficient amount of intrinsic factor, which is one of the prime reasons for the appearance of the symptoms of pernicious anemia. After the discovery of the existence of intrinsic factor, this was first supplied by whole stomach or whole duodenum, usually from pigs. As daily doses up to as much as 50 grams were required, this presented a serious problem because the material was unpalatable in such large amounts and constituted a grave ordeal for the patient. In some cases, an improvement was obtained by dehydrating and defatting the whole stomach which reduced the dose to a few grams instead of 40 to 50 grams which was a big improvement but still only reluctantly acceptable by the patient. Various attempts were made culminating in the production of a concentrate described in the patent to Williams, Ellenbogen and Olsen, No. 2,848,367 of August 19, 1958. This product also had an augmentative effect which was not obtained hitherto. Intrinsic factors which had been produced before tended to inhibit the uptake of vitamin $B_{12}$ by healthy individuals, although useful in combatting pernicious anemia. The augmentive product of the patent does not have this undesirable effect and in fact increases the uptake of vitamin $B_{12}$ in healthy individuals. The high potency product of the present invention possesses the same desirable property. The product of the patent was produced from slurried material by a process involving six fractionation steps, first, extraction twice with saline solution, then two precipitations by the addition of ammonium sulfate followed by dialysis and drying. This concentrate is a high grade product which is satisfactory from the standpoint of the patient and which shows a potency of 30 milligrams or somewhat less per daily dose. Despite the high quality of the concentrate obtained, the process remains time-consuming and expensive and while it has seen extensive commercial use and is thoroughly practical, it still leaves something to be desired from the standpoint of cost and simplicity.

The present invention is an improvement on the above-described process which produces a concentrate as a dry, free-flowing powder with a potency as high and in some cases substantially higher than that produced by the patent process. The potency is at least approximately 15 mg. for a daily dose. At the same time, the process is reduced by the elimination of four of the steps without adversely affecting the quality of the product. In other words, the same high quality product is produced with the elimination of more than half of the steps required.

The process combines the following features. The source is the pyloric mucosa of hog stomachs, that is to say the portion of the mucosa which are near to the pyloric end of the stomach. The pyloric mucosa in comminated form are then twice extracted in cold, essentially aqueous medium. Extraction is preferably with cold water although the presence of a small amount of salts, such as a saline solution of about 1% concentration, may also be used. The amount of salt introduced is so much less than in the case of ammonium sulfate precipitations that it does not seriously contaminate the final product. There is no advantage, however, over the use of cold water and this is preferred although in its broader aspects, the invention includes dilute saline solutions which are sufficiently dilute so that the medium is essentially aqueous. The steps of precipitation of ammonium sulfate in two steps followed by dialysis are eliminated entirely but the drying must not involve long operation in the presence of moisture. For practical purposes, by far the best method of drying is spray drying in which the moisture is evaporated very rapidly. This is the cheapest and best process and is the preferred embodiment of the present invention.

The three steps of the process of the present invention produce a dry, free-flowing powder of very low moisture content and high bulk density which has adequate stability and which has a potency at least as good and in some cases better than the product of the above referred-to patent which involved six steps. Needless to say, the cost of producing the concentrated intrinsic factor is greatly reduced and the operating procedure simplified by the elimination of more than half of the steps hitherto required without any sacrifice in quality of the final product. The individual operations as manipulative steps and the source of material are not individually old. The invention lies in the combination which produces the same high quality result with the elimination of steps hitherto required.

The source of material presents no serious practical problems. As has been done in the past in using hog stomach mucosa, it is of course necessary to use either fresh mucosa or mucosa which has been frozen or otherwise preserved shortly after its separation from the other portions of the stomach. Of course, the same care in freeing the mucosa from other constituents must be used as has been done in the past.

The extraction with cold water which is repeated presents no particular problem. The exact temperature of the water is not sharply critical. It should in general be below room temperature and preferably not higher than 10° C. As ice water is a very simple way of obtaining cold water reliably, this is preferred, although the invention is in no way limited to a temperature at or slightly above 0° C. The amount of water is also not critical. In general, more water than mucosa will be used and ratios from 2 to 5 to 1 in the first extraction and from equal parts to about 3 to 1 in the second extraction gives satisfactory results. Optimum results are obtainable with a water to mucosa ratio of substantially 4 to 1 in the first extraction and 2 to 1 in the second extraction.

The time of the extraction is not critical. It is desirable to stir the mucosa with the cold water in the first extraction for sufficient time to allow thorough mixture. The time is not critical and good results can be obtained from a quarter of an hour to an hour. Longer times do no harm but show no advantage. The extraction itself, which is a separation of the cold water extract from a solid mucosa, can be effected by conventional means. Centrifuging is preferred because of its speed but other solid-liquid separations are quite suitable. Care should be taken, however, that if the extraction process is slow, precautions be taken to prevent the extract from reaching excessive temperatures on hot days and this is another reason why a rapid separation, such as centrifuging which can be effected in a few minutes, presents a practical operating advantage.

The vital step of drying can be effected in any suitable spray drying equipment and inlet air temperatures can be used which are within the range of conventional spray drying. Excellent results are obtained with inlet air temperatures slightly above 300° F. The cooling effect of the almost instantaneous evaporation will normally drop the temperature of the outgoing air 100° F. to 150° F. It is essential that spray drying be used but the spray drying procedure, as far as equipment and operating conditions are concerned, approximates those used in other spray drying operations of moderately sensitive materials.

The final product is free-flowing and has a low moisture content, usually not in excess of 6%. The powder has good stability under normal storage conditions and is in no way inferior to the instability to the concentrate obtained by the process of the patent referred to above.

The invention will be described in greater detail in conjunction with the following specific examples.

*Example 1*

200 kg. of hog stomach pyloric mucosa, suitably comminuted, is slurried with 800 liters of ice water and the slurry agitated for 50 minutes.

The first extraction is effected by passing the slurry through a centrifuge. The filtrate is saved and the solids are slurried up with 205 liters of ice water and introduced into the second extraction which is effected also in a centrifuge. The two extracts are combined amounting to about 1400–1410 liters with a solids content of about 0.87%.

*Example 2*

The extracts produced in Example 1 are spray dried in a standard spray drier at the rate of 4.6 pounds of extract per minute, the air inlet temperature averaging 320° F. with a maximum of about 325° F. and an outlet temperature of 185–190° F. results. The solids of the extract come down as a free-flowing powder having 3.3–5.2% moisture.

*Example 3*

The combined extracts from Example 1 are spray dried at 5.4 pounds per minute with an air inlet temperature averaging 320° F. and an outlet temperature averaging 190° F. The product is a free-flowing powder with a moisture content of 4.3% to 6%.

The product, as in the case of the product of Example 2, shows a high potency and daily doses of about 15 milligrams per day when administered with a suitable amount of vitamin $B_{12}$ to patients with pernicious anemia show a red blood cell count increase of the same magnitude as the product of the above-described patent. The potency varies slightly from batch to batch due to some variation in the intrinsic factor content of the pyloric mucosa used. The potency figures of about 15 milligrams per day are taken from a number of commercial batches and batch products can be blended to produce a uniform high potency.

We claim:

1. An improved process for obtaining intrinsic factor concentrate in free-flowing particulate form and having a potency of at least 30 milligrams daily dosage which comprises slurrying comminuted pyloric mucosa from hog stomachs with a cold, essentially aqueous medium, separating solids from the liquid extract by a filtration procedure thereby producing a filtrate containing intrinsic factor, reslurrying the so separated solids with cold water, repeating the separation step, combining the filtrates and subjecting them to spray-drying to form a free-flowing, high potency intrinsic factor containing powder.

2. An improved process for obtaining intrinsic factor concentrate in free-flowing particulate form and having a potency of at least 30 milligrams daily dosage which comprises slurrying comminuted pyloric mucosa from hog stomachs with cold water, separating solids from the liquid extract by a filtration procedure thereby producing a filtrate containing intrinsic factor, reslurrying the so separated solids with cold water, repeating the separation step, combining the filtrates and subjecting them to spray-drying to form a free-flowing, high potency intrinsic factor containing powder.

3. An improved process for obtaining intrinsic factor concentrate in free-flowing particulate form and having a potency of at least 30 milligrams daily dosage which comprises slurrying comminuted pyloric mucosa from hog stomachs with water having a temperature below 10° C., separating solids from the liquid extract by a filtration procedure thereby producing a filtrate containing intrinsic factor, reslurrying the so separated solids with water having a temperature below 10° C., repeating the separation step, combining the filtrates and subjecting them to spray-drying to form a free-flowing, high potency intrinsic factor containing powder.

4. An improved process for obtaining intrinsic factor concentrate in free-flowing particulate form and having a potency of at least 30 milligrams daily dosage which comprises slurrying comminuted pyloric mucosa from hog stomachs with ice water, separating solids from the liquid extract by a filtration procedure thereby producing a filtrate containing intrinsic factor, reslurrying the so separated solids with ice water, repeating the separation step, combining the filtrates and subjecting them to spray-drying to form a free-flowing, high potency intrinsic factor containing powder.

5. An improved process for obtaining intrinsic factor concentrate in free-flowing particulate form and having a potency of at least 30 milligrams daily dosage which comprises slurrying comminuted pyloric mucosa from hog stomachs with water having a temperature below 10° C., separating solids from the liquid extract by centrifuging thereby producing a filtrate containing intrinsic factor, reslurrying the so separated solids with water having a temperature below 10° C., repeating the separation step, combining the filtrates and subjecting them to spray-drying to form a free-flowing, high potency intrinsic factor containing powder.

6. An improved process for obtaining intrinsic factor concentrate in free-flowing particulate form and having a potency of at least 30 milligrams daily dosage which comprises slurrying comminuted pyloric mucosa from hog stomachs with a cold, essentially aqueous medium, separating solids from the liquid extract by centrifuging thereby producing a filtrate containing intrinsic factor, reslurrying the so separated solids with cold water, repeating the separation step, combining the filtrates and subjecting them to spray-drying to form a free-flowing, high potency intrinsic factor containing powder.

7. An improved process for obtaining intrinsic factor concentrate in free-flowing particulate form and having a potency of at least 30 milligrams daily dosage which comprises slurrying one part of comminuted pyloric mucosa from hog stomachs with from 2 to 5 parts of a cold, essentially aqueous medium, separating solids from the liquid extract by a filtration procedure thereby producing a filtrate containing intrinsic factor, reslurrying each part of the so separated solids with from 1 to 3 parts of cold water, repeating the separation step, combining the filtrates and subjecting them to spray-drying to form a free-flowing, high potency intrinsic factor containing powder.

8. An improved process for obtaining intrinsic factor concentrate in free-flowing particulate form and having a potency of at least 30 milligrams daily dosage which comprises slurrying one part of comminuted pyloric mucosa from hog stomachs with from 2 to 5 parts of ice water, separating solids from the liquid extract by a filtration procedure thereby producing a filtrate containing intrinsic factor, reslurrying each part of the so separated solids with from 1 to 3 parts of ice water, repeating the separation step, combining the filtrates and subjecting them to spray-drying to form a free-flowing, high potency intrinsic factor containing powder.

9. An improved process for obtaining intrinsic factor concentrate in free-flowing particulate form and having a potency of at least 30 milligrams daily dosage which comprises slurrying one part of comminuted pyloric mucosa from hog stomachs with from 2 to 5 parts of ice water, separating solids from the liquid extract by centrifuging thereby producing a filtrate containing intrinsic factor, reslurrying each part of the so separated solids with from 1 to 3 parts of ice water, repeating the separation step, combining the filtrates and subjecting them to spray-drying to form a free-flowing, high potency intrinsic factor containing powder.

References Cited in the file of this patent

UNITED STATES PATENTS 2,099,708 Sharp _____ Nov. 23, 1937

FOREIGN PATENTS 745,473 Great Britain _____ Feb. 29, 1956

OTHER REFERENCES

Heinrich: Vitamin $B_{12}$ and Intrinsic Factor, 1957, Ferdinand Enke Verlag, Stutgart, pp. 161–163.

UNITED STATES PATENT OFFICE
CERTIFICATION OF CORRECTION

Patent No. 3,015,608 January 2, 1962

Leon Ellenbogen et al.

It is hereby certified that error appears in the above numbered patent requiring correction and that the said Letters Patent should read as corrected below.

In the grant, lines 1 and 2, for "Leon Ellenbogen and William L. Williams, of New City, New York," read -- Leon Ellenbogen, William L. Williams, and George Clark Sawyer, of New City, New York, --; in the heading to the printed specification, lines 4 and 5, for "Leon Ellenbogen and William L. Williams, New City, N. Y.," read -- Leon Ellenbogen, William L. Williams, and George Clark Sawyer, New City, N. Y., --.

Signed and sealed this 19th day of June 1962.

(SEAL)
Attest:

ERNEST W. SWIDER
Attesting Officer

DAVID L. LADD
Commissioner of Patents